(12) United States Patent
Yan et al.

(10) Patent No.: US 8,345,450 B2
(45) Date of Patent: Jan. 1, 2013

(54) RESONANT CONVERTER HAVING OVER-CURRENT PROTECTION APPARATUS AND CONTROLLING METHOD THEREOF

(75) Inventors: Chao Yan, Shanghai (CN); Jianhong Zeng, Shanghai (CN); Wenxin Zhang, Shanghai (CN); Yiqing Ye, Shanghai (CN); Jianping Ying, Shanghai (CN); Peter Barbosa, Taoyuan Hsien (TW); Wen-Chang Lee, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 343 days.

(21) Appl. No.: 12/854,253

(22) Filed: Aug. 11, 2010

(65) Prior Publication Data

US 2011/0038181 A1 Feb. 17, 2011

(30) Foreign Application Priority Data

Aug. 11, 2009 (TW) .................................. 98127033 A (51) Int. Cl.
*H02M 3/335* (2006.01)

(52) U.S. Cl. .......................................... 363/16; 363/131
(58) Field of Classification Search .................. 363/131, 363/123, 15, 16
See application file for complete search history.

(56) References Cited

U.S. PATENT DOCUMENTS 6,479,949 B1* 11/2002 Nerone et al. ................. 315/291
7,432,660 B2* 10/2008 Blair et al. ............. 315/209 CD

* cited by examiner

*Primary Examiner* — Shawn Riley
(74) *Attorney, Agent, or Firm* — Haverstock & Owens LLP (57) ABSTRACT

The configurations of a DC/DC resonant converter and a controlling method thereof are provided. The proposed converter includes an over-current protection apparatus including a first switch element having a first and a second terminals, and a first voltage element having a negative terminal coupled to a positive terminal of a DC input voltage source and a positive terminal coupled to the second terminal of the first switch element.

22 Claims, 10 Drawing Sheets

RESONANT CONVERTER HAVING OVER-CURRENT PROTECTION APPARATUS AND CONTROLLING METHOD THEREOF

FIELD OF THE INVENTION

The present invention relates to an over-current protection apparatus in a resonant circuit and a method thereof. More particularly, it relates to an over-current protection apparatus in a DC/DC resonant converter and a controlling method thereof.

BACKGROUND OF THE INVENTION

The developing trend of the DC/DC converter is just like that of the most of the power supply products—high efficiency, high power density and low cost. The resonant converters such as the LLC converters are more and more broadly applied to the DC/DC converters due to its advantages of zero-voltage turn-on of the switches on the primary side and the zero-current turn-on/off of the switches on the secondary side at a fall range of load.

However, in the realistic applications, the over-current protection (OCP) is a more critical problem. When a resonant circuit is over-loaded or short-circuited, the resonant current of the circuit is quite large. And if it is not limited, the converter circuit would be damaged or failed due to the large current. OCP circuit could accomplish a rapid protection of the resonant converter under abnormal conditions e.g. over-loaded or short-circuited circumstances, and limit the inrush current during start-up.

In order to engage the OCP towards the resonant circuits, the first method is increasing the operating frequency of the converter. Through increasing the operating frequency of the converter, the impedance of the resonant tank is increased to realize the current limiting. This method is simple and easy to be realized, but has the following drawbacks: under the OCP, the frequency of switches of circuit is higher than the frequency of those under the normal operation, the losses of the switches will increase dramatically; the losses of magnetic elements are increased accordingly; the heat dissipating requirements are raised; the stress on the magnetic elements are increased; and the sizes of elements are also greatly increased.

The second method is a frequency modulation (FM) plus PWM method. In this method, the frequency of the switches is increased firstly; the PWM control circuit begins to operate to modulate the pulse width of the switches when the frequency is increased to a certain extent, thus the voltage added on the resonant tank is decreased to realize the current limiting. This method is relatively more complex. The ZVS would be lost under the current limiting mode, thus the losses of the switches are increased. And the requirements towards the driving circuits are quite rigorous, and at the same time, a rapid protection is required.

Figure 1:
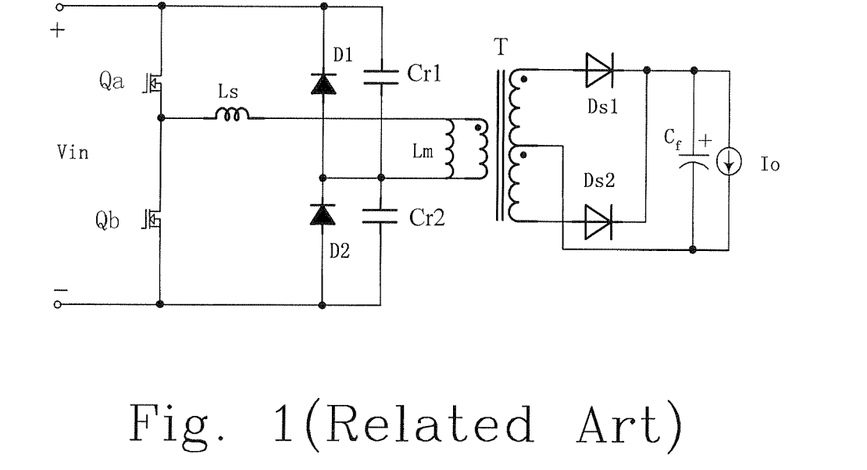
FIG. 1 shows a circuit diagram of a symmetrical half-bridge resonant converter diode-clamped the resonant capacitor voltage to the DC input voltage in the related art.
Figure 5:
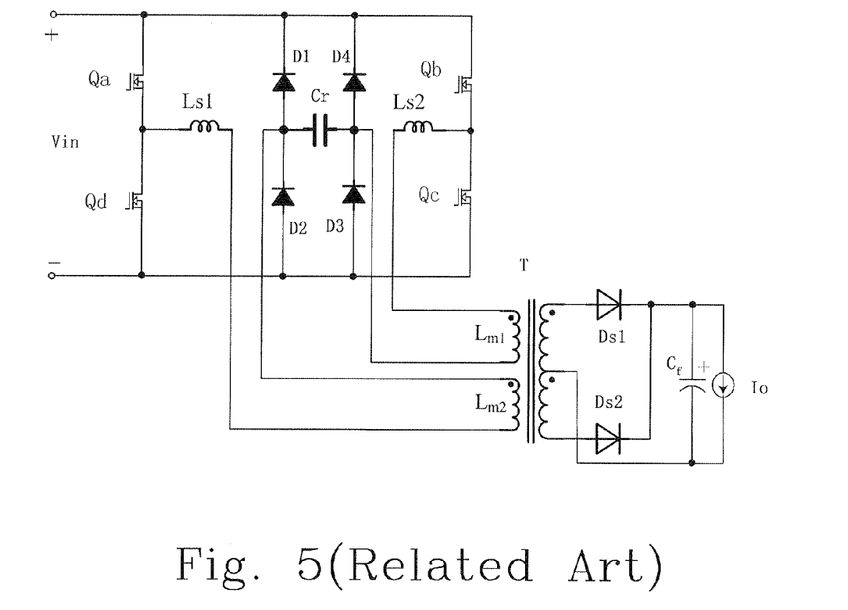
FIG. 5 shows a circuit diagram of a symmetrical full-bridge resonant converter diode-clamped the resonant capacitor voltage to the DC bus input voltage in the related art.

The third method realizes the current limiting by clamping the resonant capacitor voltage to the input voltage. FIG. 1 and FIG. 5 are respectively showing the symmetrical half-bridge and the symmetrical full-bridge resonant converters employing this method. In FIG. 1, the half-bridge resonant converter receives a DC input voltage Vin and comprises a square wave generator—the bridge arm formed by the series connected switches Qa and Qb, the resonant inductor Ls, the magnetized inductor Lm, the clamping diode D1-D2, the resonant capacitors Cr1 and Cr2 (Cr1 and Cr2 could have substantially the same capacitance), the transformer T, the rectifying diodes Ds1-Ds2, the output capacitor Cf and the load (the load of the LLC resonant circuit appears to have the characteristics of a current source, and a current source Io is used here to express). In FIG. 5, the full-bridge resonant converter comprises a square wave generator—two bridge arms formed by the four switches Qa, Qb, Qc and Qd, two resonant inductors Ls1 and Ls2 connected in series (e.g. Ls1 and Ls2 could be symmetrical, that is, Ls1 and Ls2 have substantially the same inductance), two magnetizing inductors Lm1 and Lm2 connected in series (e.g. Lm1 and Lm2 could be symmetrical, that is, Lm1 and Lm2 have the same inductance). And Lm1 and Lm2 are the two magnetizing inductors of the transformer T which can also be shown as two inductors connected in parallel with the primary windings of the transformer T as in FIG. 1, e.g., it could be half of the inductance of a single magnetizing inductor Lm, i e Lm/2), four clamping diodes D1-D4, and a resonant capacitor Cr which is connected to D1 and D2 and to D3 and D4. And the elements of the secondary side of the converter are the same as those in FIG. 1. This method is a passive control method, which is simple and easy to be realized, and does not need extra control circuit to realize the current limiting of each period. In this method, only some clamping diodes and using a symmetrical structure for the resonant circuit are enough. But due to that the clamping voltage is the input DC voltage in this method, the maximum voltage on the resonant capacitor could only be the input voltage. Thus the voltage of the resonant capacitor changes according to of the input voltage, and that is to say the clamping voltage is varied following the change of the input voltage. That will make the design of the resonant circuit to be limited to a certain extent, and the operational scope of the resonant circuit is also influenced.

Figure 2:
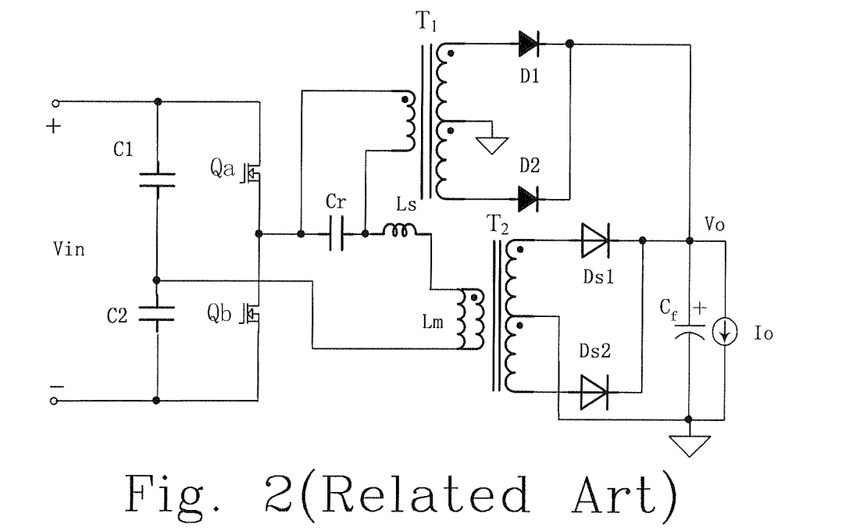
FIG. 2 shows a circuit diagram of a symmetrical half-bridge resonant converter using auxiliary transformer to clamp the resonant capacitor voltage to the converter output of the secondary side in the related art.

The fourth method adds an auxiliary transformer to clamp the resonant capacitor voltage. As shown in FIG. 2, it is a symmetrical half-bridge resonant circuit adding the auxiliary transformer T1 to commonly clamp the resonant capacitor Cr voltage to be limited to the secondary side output voltage V0. The voltage on the resonant capacitor Cr is clamped to the output voltage value Vo of the resonant converter through the auxiliary transformer T1 and the clamping diodes D1-D2. Through adding the auxiliary transformer T1, the clamping voltage value could be changed, and the more flexible design for the clamping voltage could be realized. This method could make the design of resonant converter no longer restricted by the clamp voltage to some extent, but an extra magnetic element—a transformer T1 is required. Thus extra loss is generated; the efficiency is decreased; the cost is increased; and there are existing safety and regulation problems too.

The fifth method adds auxiliary winding coupled to the transformer or the resonant inductor and clamping diodes to clamp the resonant capacitor voltage.

Figure 3:
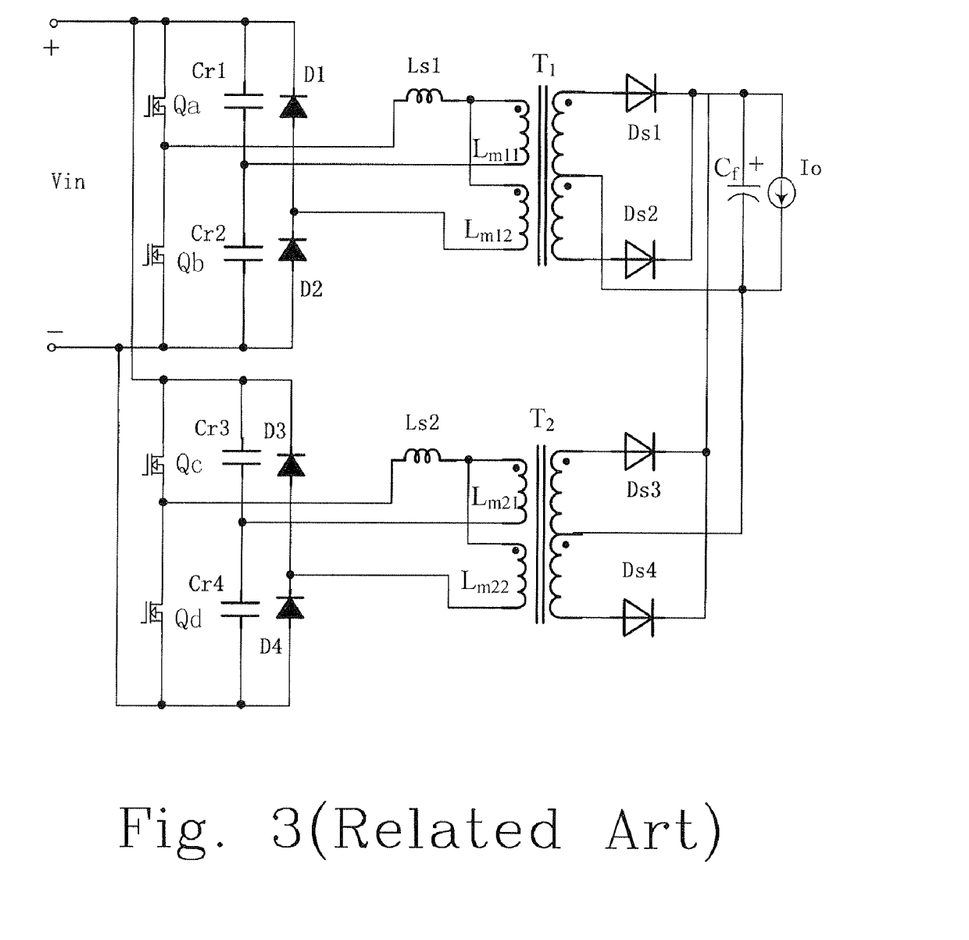
FIG. 3 shows a circuit diagram of two half-bridge resonant converters having clamping windings coupled on the two transformers and operating commonly with the clamping diodes to clamp the resonant capacitor voltage to the DC input voltage in the related art.
Figure 4:
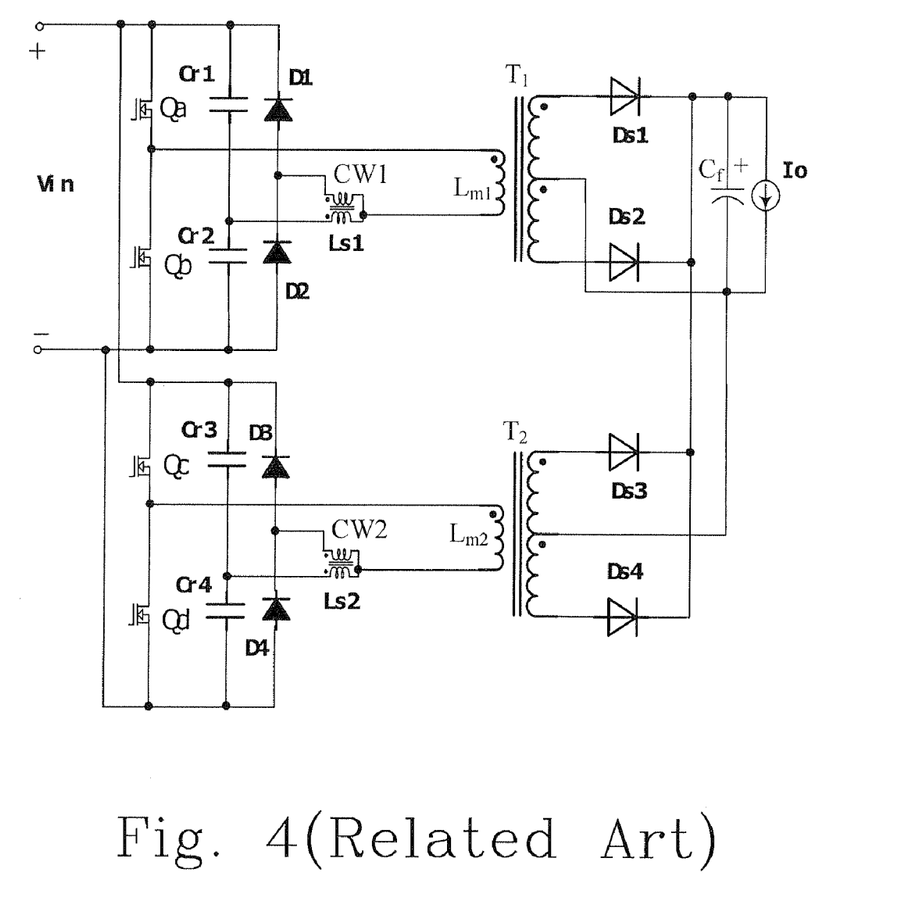
FIG. 4 shows a circuit diagram of two half-bridge resonant converters having clamping windings coupled on the resonant inductors and operating commonly with the clamping diodes to clamp the resonant capacitor voltage to the DC input voltage in the related art.

As shown in FIG. 3, two half-bridge resonant circuits comprise switches Qa-Qd and resonant inductors Ls1-Ls2 (e.g. Ls1 and Ls2 could have the same inductance value) in their primary sides, and the rectifying diodes Ds1-Ds4 and the output capacitor Cf in their secondary sides, wherein each resonant circuit respectively has the clamping windings Lm12 and Lm22 and the diodes D1-D2 and D3-D4 to clamp the resonant capacitor voltages of Cr1 -Cr2 and Cr3-Cr4 to the input voltage Vin. FIG. 4 shows two half-bridge resonant circuits with the clamping windings CW1 and CW2 coupled to the resonant inductor Ls1 and Ls2 respectively and diodes to clamp the resonant capacitor voltage to the input voltage. The difference between FIG. 4 and FIG. 3 are that the resonant inductors Ls1-Ls2 on the primary side coupled to the clamping windings CW1 and CW2 respectively, while the secondary side of FIG. 4 is the same as that of FIG. 3. This method causes the magnetic elements to have complex configurations, and the losses and the costs to be increased, and the efficiency to be decreased.

In general, one could observe that the above-mentioned related arts either have a complex control, or require extra magnetic elements, and both of which result in the increase of the cost and the volume, and the decrease of the efficiency. The method in FIG. 1 or FIG. 5 is relatively simple, but since the clamping voltage could only be the input voltage, thus the clamping voltage varies with the fluctuation of the DC input voltage, and the operation scope of the converter is limited. Especially during the dynamic switching of the load the DC input voltage of the converter decreases, so does the clamping voltage. Then the clamp circuit is easy to work and the design of the circuit parameters is limited.

Keeping the drawbacks of the prior arts in mind, and employing experiments and research full-heartily and persistently, the applicants finally conceived resonant converter having an over-current protection apparatus and a controlling method thereof.

SUMMARY OF THE INVENTION

It is therefore an object of the present invention to provide an over-current protection apparatus in a DC/DC resonant converter and a controlling method thereof to provide an OCP when the secondary side of the resonant converter is short-circuited, to solve the problem of the switch current stress is overly large on the primary side, and to solve the problems such as resonant capacitor voltage could only be clamped to the input voltage, the primary side switch current stress is totally decided by the input voltage, and the design parameters of resonant converter circuit and the operational scope are limited.

According to the first aspect of the present invention, a DC/DC resonant converter comprises a square wave generator configured to generate a voltage having a square waveform, having a first input terminal receiving a DC input voltage, a resonant tank coupled to the square wave generator and comprising a first resonant capacitor and a resonant inductor coupled to the first resonant capacitor, and an over-current protection apparatus coupled with the first resonant capacitor and the first input terminal, and comprising a first switch element having a first and a second terminals and a first voltage element having a negative terminal coupled to the first input terminal and a positive terminal coupled to the second terminal of the first switch element.

Preferably, the square wave generator further comprises a second input terminal receiving the DC input voltage, and a first bridge arm coupled with the first and the second input terminals, which comprises a first switch and a second switch connected in series with the first switch.

Preferably, the first resonant capacitor has a first terminal coupled to the negative terminal of the first voltage element and a second terminal coupled to the first terminal of the first switch element.

Preferably, the converter further comprises a second resonant capacitor having a first and a second terminals, wherein the second resonant capacitor is connected in series with the first resonant capacitor with the first terminal of the second resonant capacitor connected to the second terminal of the first resonant capacitor and the second terminal of the second resonant capacitor connected to the second input terminal.

Preferably, the over-current protection apparatus further comprises a second switch element having a first terminal and a second terminal coupled to the first terminal of the first resonant capacitor, and a second voltage element having a negative terminal coupled to the first terminal of the second switch element and a positive terminal coupled to the second input terminal.

Preferably, the first and the second switch elements respectively are a first and a second clamping diodes, each of which has an anode and a cathode, and the anode and the cathode of each the respective diode are the first and the second terminals of each the respective switch element respectively.

Preferably, each of the first and the second voltage elements is one of a varistor, a gas tube, a single directional TVS, a bidirectional TVS, a parallel-connected RC circuit and a MOSFET having a gate and a source connected to the gate or the combination thereof.

Preferably, the converter further comprises a switching switch circuit, a magnetizing inductor, a transformer, an output rectifier circuit, an output capacitor and being an LLC resonant converter, wherein the magnetizing inductor is connected in series with the resonant inductor and connected in parallel with a primary winding of the transformer; wherein the output rectifier circuit is connected to a secondary winding of the transformer and the output capacitor.

Preferably, the converter further comprises a third and a fourth resonant capacitors, each of which has a first and a second terminals, wherein the first terminal of the first resonant capacitor is coupled to the negative terminal of the first voltage element, the first terminal of the fourth resonant capacitor is coupled to the second terminal of the first resonant capacitor, the first terminal of the third resonant capacitor is coupled to the second terminal of the fourth resonant capacitor and the second terminal of the second switch element, the first terminal of the first switch element is coupled to the second terminal of the third resonant capacitor and the first terminal of the second resonant capacitor, and the second terminal of the second resonant capacitor is coupled to the second input terminal.

Preferably, the square wave generator further comprises a second bridge arm coupled with the first input terminal and the second input terminal and comprising a third switch and a fourth switch connected in series with the third switch.

Preferably, the first resonant capacitor has a first and a second terminals, the over-current protection apparatus further comprises a second, a third and a fourth switch elements, each of which has a first and a second terminals, the first terminal of the first resonant capacitor is coupled to the second terminal of the second switch element, the second terminal of the first resonant capacitor is coupled to the first terminal of the fourth switch element, the second terminal of the second switch element is coupled to the first terminal of the first switch element, the first terminal of the third switch element is coupled to the first terminal of the second switch element, the second terminal of the fourth switch element is coupled to the second terminal of the first switch element, the first terminal of the fourth switch element is coupled to the second terminal of the third switch element, the second input terminal is coupled to the first terminal of the third switch element, the negative terminal of the first voltage element is coupled to the first input terminal, and the positive terminal of the first voltage element is coupled to the second terminal of the first switch element.

Preferably, the first to the fourth switch elements are respectively a first, a second, a third and a fourth clamping diodes, each of which has an anode and a cathode, and the anode and the cathode of each the respective diode are the first and the second terminals of each switch element respectively.

Preferably, the converter is an LLC circuit and further comprises a switching switch circuit, a first and a second resonant inductors, a first and a second magnetizing inductors, a first and a second transformers, a synchronous rectification circuit, a first and a second output capacitors, an output inductor, wherein the switching switch circuit is connected in series with the first and the second input terminals and the first and the second magnetizing inductors, the first magnetizing inductor is connected in series with the second resonant inductor, the second magnetizing inductor is connected in series with the first resonant inductor, the first resonant capacitor is connected between the first resonant inductor, the second magnetizing inductor and the second resonant inductor, the first magnetizing inductor; wherein a primary side of the first transformer is connected in parallel with the first magnetizing inductor and a primary side of the second transformer is connected in parallel with the second magnetizing inductor; wherein secondary sides of the first and second transformer are connected in parallel with each other and connected to the synchronous rectification circuit and the first and the second output capacitors.

Preferably, the over-current protection apparatus further comprises a and a negative terminal of the second voltage element is coupled to the first terminal of the second switch element, and a positive terminal of the second voltage element is coupled to the second input terminal.

Preferably, the converter is an LLC circuit and further comprises a first and a second resonant inductors, a first and a second magnetizing inductors, a transformer, a synchronous rectification circuit, a first and a second output capacitors, and an output inductor; wherein the first resonant inductor is coupled to the second magnetizing inductor, the second magnetizing inductor is coupled to the first terminal of the first resonant capacitor, the second resonant inductor is coupled to the first magnetizing inductor, and the first magnetizing inductor is coupled to the second terminal of the first resonant capacitor; wherein the transformer is coupled to the first and the second magnetizing inductors, the synchronous rectification circuit, the first and the second output capacitors and the output inductor.

Preferably, the converter further comprises a second and a third resonant capacitors, wherein each of the second and the third resonant capacitors has a first and a second terminals, the first and the second terminals of the second resonant capacitor are coupled to the second magnetizing inductor and the first terminal of the first resonant capacitor respectively, and the first and the second terminals of the third resonant capacitor are coupled to the second terminal of the first resonant capacitor and the first magnetizing inductor respectively.

According to the second aspect of the present invention, a DC/DC resonant converter comprises an over-current protection apparatus comprising a first switch element having a first and a second terminals, and a first voltage element having a negative terminal coupled to a positive terminal of a DC input voltage source and a positive terminal coupled to the second terminal of the first switch element.

According to the third aspect of the present invention, a controlling method for a DC/DC resonant converter having an over-current protection apparatus, a resonant tank having a resonant capacitor and a switching circuit having a first set of switches comprises the steps of: (a) providing an input voltage to the resonant converter and generating a voltage of the resonant capacitor and a current in the resonant tank; (b) turning on the first set of switches of the switching circuit when the converter is in a normal operational stage; (c) turning on the over-current protection apparatus when the voltage of the resonant capacitor exceeds the input voltage and reaches a first predetermined value; and (d) turning off the first set of switches when the t current in the resonant tank begins to decrease from a maximum positive resonant current value.

Preferably, t the steps (b) and (c) further comprise the steps of: (b1) loading the input voltage to the resonant tank; (b2) increasing the current from zero to the maximum positive resonant current value; and (b3) increasing the voltage from a maximum negative clamping voltage value to a maximum positive clamping voltage value, wherein the maximum positive clamping voltage value is larger than the input voltage value; and (c1) clamping the resonant capacitor voltage at the maximum positive clamping voltage value; and (c2) causing the resonant current to be limited at the maximum positive resonant current value.

The present invention may best be understood through the following descriptions with reference to the accompanying drawings, in which:

DETAILED DESCRIPTION OF THE PREFERRED EMBODIMENT

The present invention provides an apparatus in a DC/DC resonant converter to provide an over-current protection (OCP) function in abnormal condition e.g. when the secondary side of the resonant converter is short-circuited, to reduce the current stress of the switch in the primary side, and to solve the problems such as the resonant capacitor voltage could only be clamped to the input voltage which results that the current stress of the primary side switch is totally decided by the input voltage, and the design parameters of resonant converter circuit and the operational scope are limited.

Figure 6:
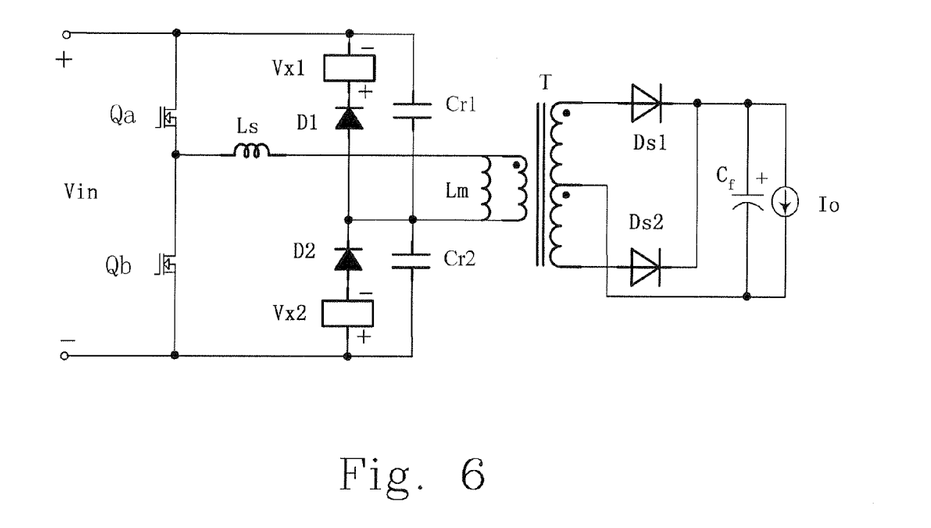
FIG. 6 shows a circuit diagram of a symmetrical half-bridge resonant converter diode-clamped the resonant capacitor voltage according to the first preferred embodiment of the present invention.
Figure 7:
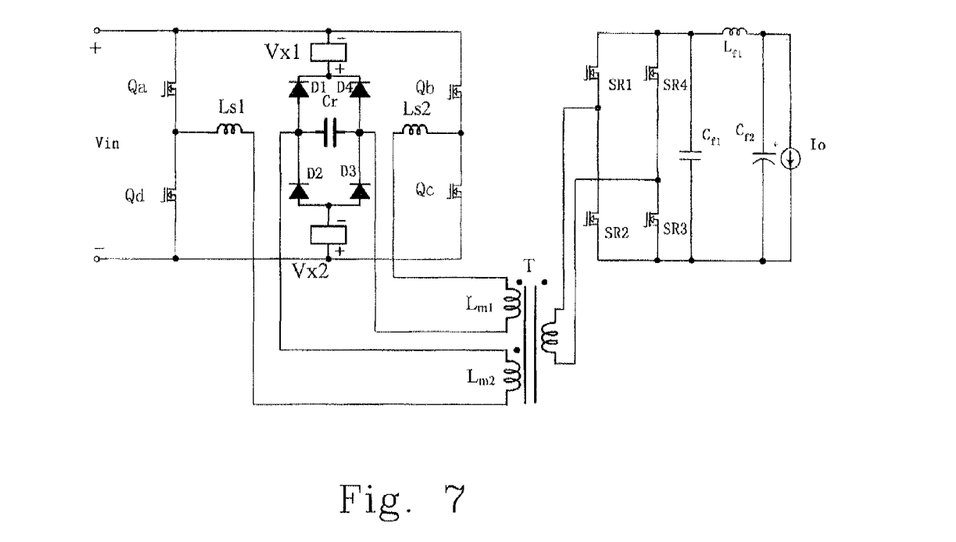
FIG. 7 shows a circuit diagram of a symmetrical full-bridge resonant converter diode-clamped the resonant capacitor voltage according to the second preferred embodiment of the present invention.
Figure 8:
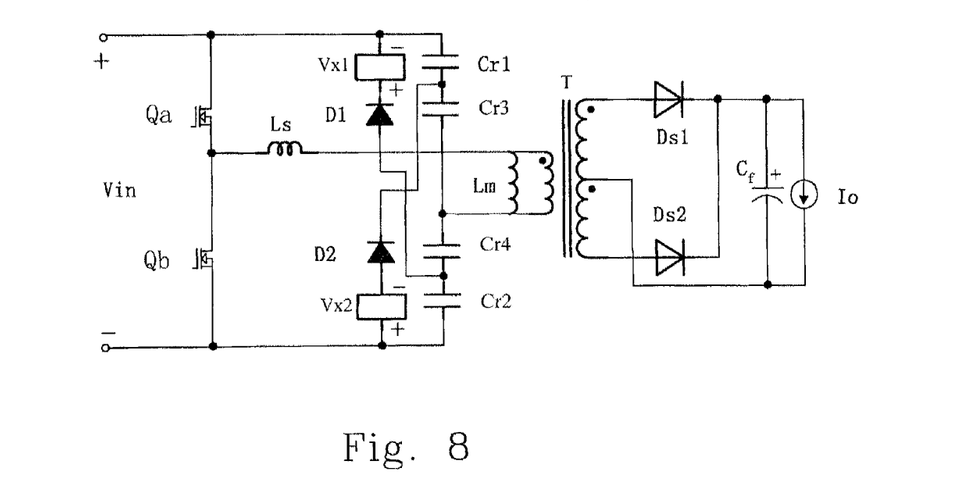
FIG. 8 shows a circuit diagram of a symmetrical half-bridge resonant converter diode-clamped a part of the resonant capacitor voltages according to the third preferred embodiment of the present invention.
Figure 9:
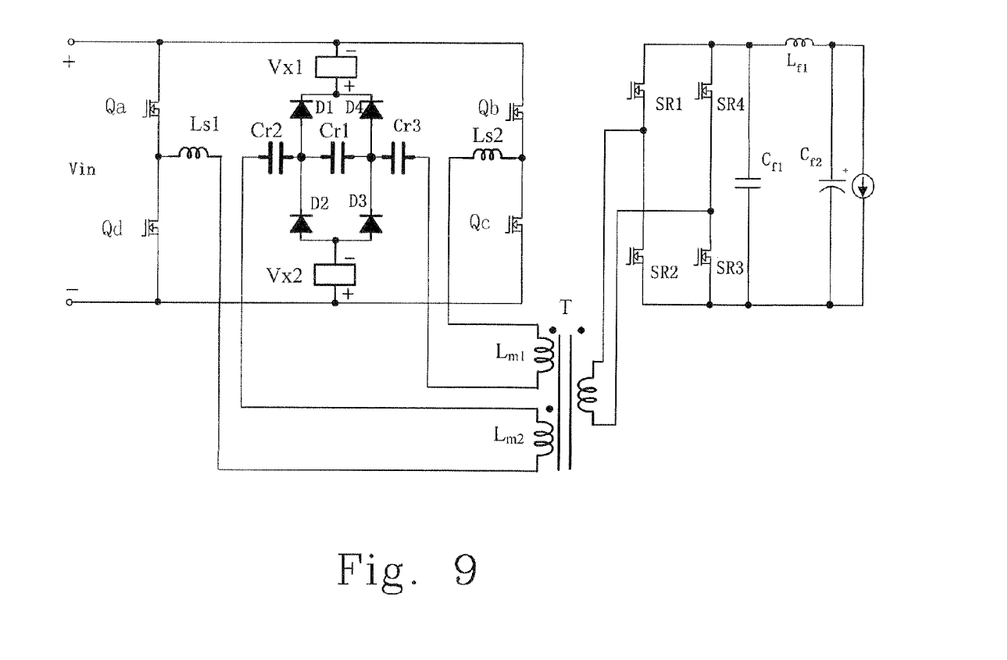
FIG. 9 shows a circuit diagram of a symmetrical full-bridge resonant converter diode-clamped a part of the resonant capacitor voltages according to the fourth preferred embodiment of the present invention.

During the abnormal condition, e.g. when the secondary side of the resonant converter is short-circuited, the voltage on resonant capacitor could be clamp to a specific value higher than the input DC voltage via the operations of switches (e.g., clamping diodes) and auxiliary circuits so as to achieve the purposes of curbing the current stress of the switches on the primary side. Thus the design parameters and the operation scope of the resonant converter are no longer limited obviously. FIG. 6 is an application of the present invention to the half-bridge resonant circuit. And FIG. 6 differs from FIG. 1 in that a first and a second voltage elements Vx1 and Vx2 are added, wherein the voltage element Vx1 (Vx2) has a positive terminal and a negative terminal and bears a positive voltage between the positive and negative terminals. In FIG. 6, Vx1 is coupled to the cathode of D1 and a positive terminal of an DC source Vin and Vx2 is coupled to the anode of D2 and a negative terminal of the DC source yin. FIG. 7 is an application of the present invention to the full-bridge resonant circuit, and FIG. 7 differs from FIG. 5 mainly in that a first and a second voltage elements Vx1 and Vx2 are added, wherein Vx1 is coupled to the cathodes of D1 and D4, and a positive terminal of an DC power source Vin and Vx2 is coupled to the anodes of D2 and D3, and a negative terminal of the DC source Vin. Besides, a full-bridge synchronous rectification circuit is on the secondary side including four synchronous rectifiers SR1-SR4, two output capacitors Cf1 -Cf2, an output inductor Lf1 and a load (indicated as a current source Io). In the first and the second preferred embodiments of the present invention, the voltages of all the resonant capacitors are clamped, e.g. Cr1 , Cr2 in FIG. 6 and Cr in FIG. 7. FIGS. 8 and 9 show the third and the fourth preferred embodiments that the voltages of a part of the resonant capacitors are clamped e.g. Cr1 in FIG. 9. FIG. 8 differs from FIG. 6 in that two resonant capacitors Cr3 and Cr4 are added and electrically connected in series with Cr2 and Cr1 respectively, and a first terminal of Cr3 and a second terminal of Cr2 are respectively coupled to a cathode of D2 and a negative terminal of an DC power source; an anode of D1 is coupled to a second terminal of Cr4 and a first terminal of Cr2. And only the voltages of Cr2 and Cr3 are clamped among all the resonant capacitors Cr1 to Cr4. FIG. 9 differs from FIG. 7 in that two resonant capacitors Cr2 and Cr3 are added besides the clamping capacitor Cr1 (corresponding to Cr in FIG. 7), wherein Cr2 is connected to Cr1 and Lm2 and Cr3 is connected to Cr1 and Lm1. And only the voltage of Cr1 is clamped among all the resonant capacitors Cr1-Cr3. In the fourth preferred embodiment, if the voltages on Cr2, Cr3 and Cr1 form a specific ratio which is close to those of Vx1, Vx2 and Cr1, then voltages on Vx1 and Vx2 could be zeros.

Figure 10A:
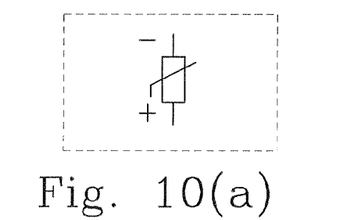
FIGS. 10(a)-10(f) respectively show various basic structures of concrete circuit diagrams of the Vx1/Vx2 in the first to the fourth preferred embodiments of the present invention.
Figure 10B:
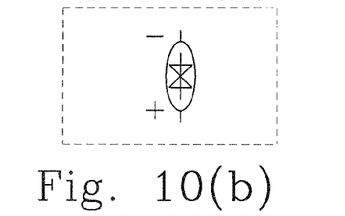
Figure 10C:
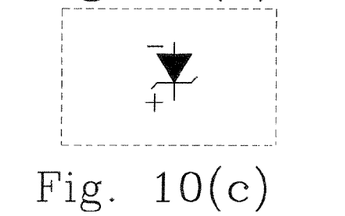
Figure 10D:
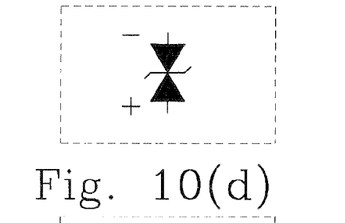
Figure 10E:
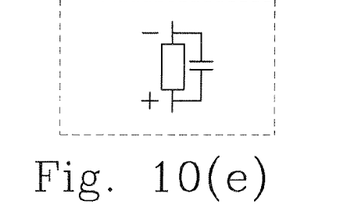
Figure 10F:
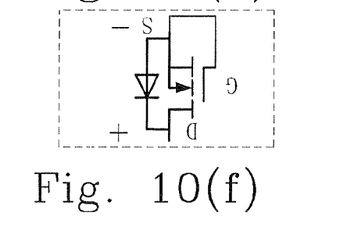

The present invention allows the clamp voltage to be higher than the DC input voltage by adding the extra voltage elements Vx1/Vx2. The voltage elements Vx1/Vx2 could be any one of the circuits listed in FIGS. 10(a) to 10(f), and could also be realized by a combination thereof or through other types of circuits. FIG. 10(a) is a varistor. It appears to have a quite large resistance when two terminals of which bear a voltage less than its rated value. And the varistor is turned on, has a rated voltage drop and appears to be a voltage source when the two terminals of which bear a voltage larger than its rated value. FIG. 10(b) is a gas tube. It appears to be an open-circuit when two terminals of the gas tube bear a voltage less than a rated voltage value. And the gas tube is turned on as a short-circuit, has a voltage drop of substantially zero when the two terminals of the gas tube bear a voltage larger than the rated voltage value. FIGS. 10(c) and 10(d) are a single directional transient voltage suppressor (TVS) and a bidirectional TVS respectively. TVS appears to have a quite large resistance when it bears a voltage less than a rated voltage. When it bears a voltage larger than the rated voltage, TVS has a voltage drop of an avalanche breakdown voltage, i.e. its rated voltage and appears to be a voltage source. FIG. 10(e) is a parallel-connected resistor-capacitor (RC) circuit which appears to be a variable voltage source, that is to say, the voltage on RC changes with the current flows through them. FIG. 10(f) is a MOSFET having its source terminal connected to its gate terminal, an avalanche breakdown effect is employed, and an avalanche breakdown voltage is viewed as a voltage source. All these elements and a combination thereof could be viewed as a voltage source in a circuit. Thus, there is not any directly functional relationship between the clamping voltage and the DC input voltage, and the clamping voltage is higher than the DC input voltage, such that the influence caused by the fluctuation of the DC input voltage during the dynamic load switching procedure could be avoided, the design of the circuit could be more flexible, and the design of parameters and operation scope are almost not limited by the clamp voltage directly. And the current limit function could be rapidly and effectively realized under the overloaded or the short-circuited situations. There are advantages of lower cost, a simple structure, and no influence on the efficiency of the circuit during normal operation etc. The proposed circuit above could be used in a half-bridge and a full-bridge resonant converter circuits, and also in the clamping circuits for three-level and multi-level resonant converter circuits.

Figure 11:
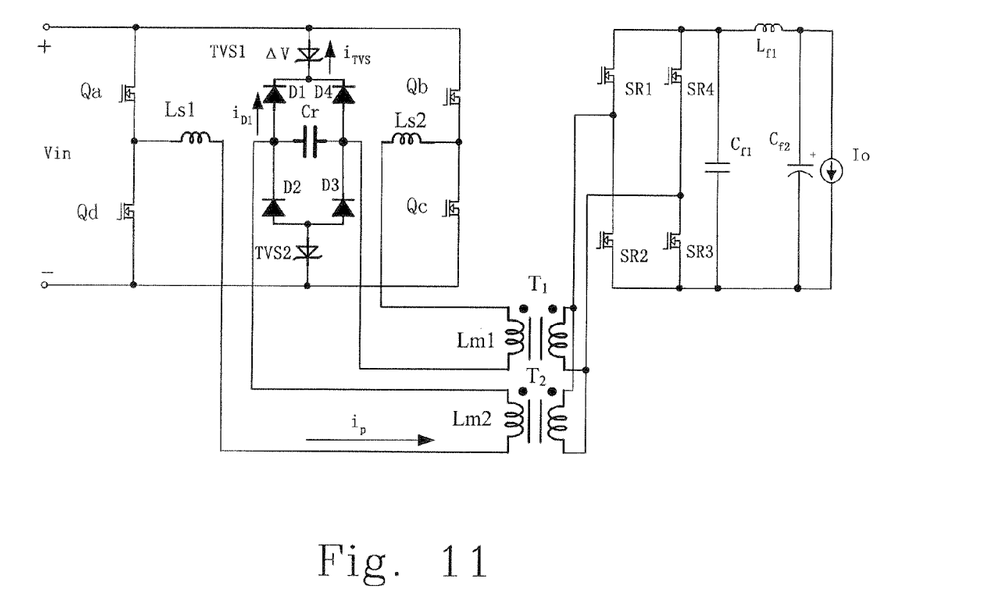
FIG. 11 shows a circuit diagram of a symmetrical full-bridge resonant converter using TVS and diode-clamped the resonant capacitor voltage to the input DC voltage according to the fourth preferred embodiment of the present invention.

A full-bridge resonant converter having TVS and diodes shown in FIG. 11 is the fourth preferred embodiment of the present invention. In FIG. 11, the square wave generator—the bridge arms formed by the Qa, Qb, Qc and Qd are the four primary side switches of the resonant converter and form the full-bridge switching circuit. To realize the voltage clamp to the resonant capacitor Cr, the resonant inductor and the primary windings are divided into two parts (Ls1 and Ls2 and Lm1 and Lm2) and the resonant capacitor Cr is connected between the resonant inductors and the primary windings. If Ls1 is equal to Ls2, Lm1 is equal to Lm2, then the primary side of the converter is symmetric to the resonant capacitor Cr. D1 to D4 are four clamping semiconductor switch elements (e.g., diodes). TVS1 and TVS2 are TVSs, which is one embodiment of the Vx1/Vx2 in the present invention. The secondary side is a full-bridge synchronous rectification circuit, which is the same as that of FIG. 7. And the resonant converter has two transformers T1, T2, wherein the primary windings of each transformer are connected in series and the secondary windings are connected in parallel.

Figure 12:
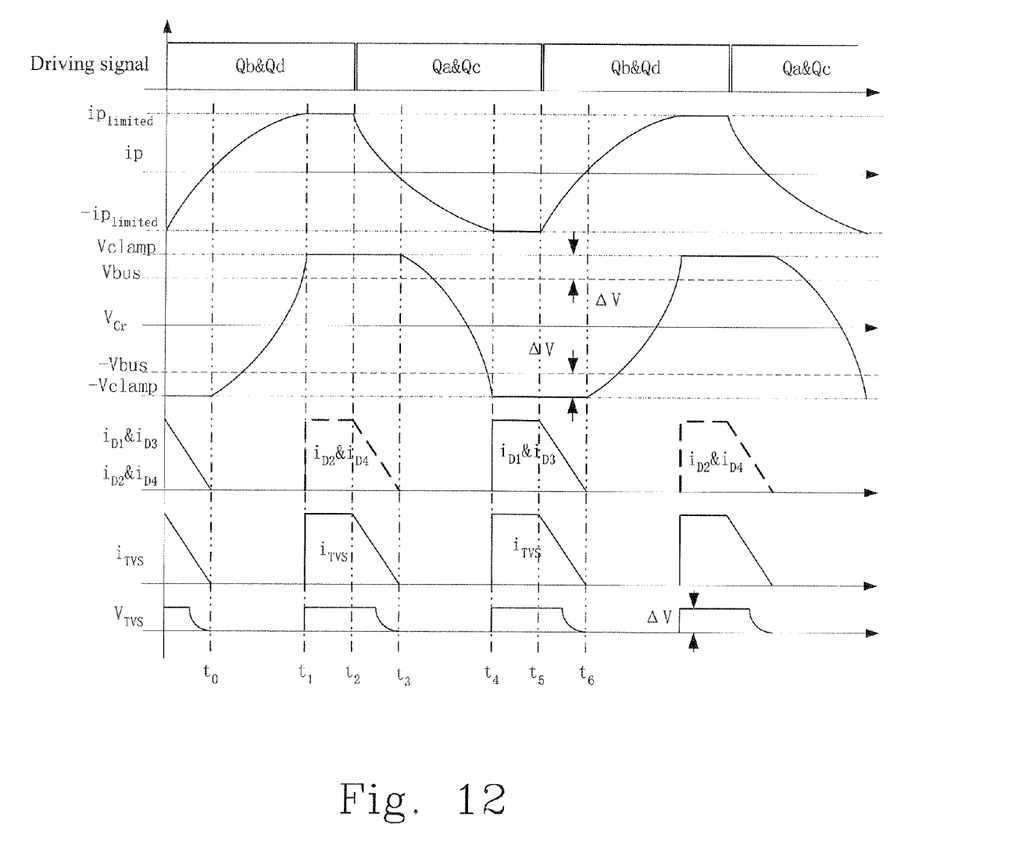
FIG. 12 is a waveform diagram of the related waveforms of the symmetrical full-bridge resonant converter using TVS and diode-clamped the resonant capacitor voltage to the input DC voltage as shown in FIG. 11.

FIG. 12 is the operation waveforms of the preferred embodiment shown in FIG. 11. The whole period is divided into 6 modes: Mode 1, Mode 2, Mode 3, Mode 4, Mode 5 and Mode 6, and the detailed analysis is described as follows:

Mode 1(t0-t1): The circuit is in a normal resonant operation stage, and the clamp circuit doesn't work. Switches Qb & Qd are on, the input voltage is added on the resonant tank (Ls1, Ls2, Lm1, Lm2, Cr). The resonant current ip increases from about zero to $ip_{limited}$; the resonant capacitor voltage Vcr increases from a maximum negative clamping voltage −Vclamp to a maximum positive clamping voltage Vclamp, wherein Vclamp is higher than the DC input voltage $V_{BUS}$ (i.e. Vin). The synchronous rectifiers SR1 and SR3 in the secondary side are on.

Mode 2 (t1-t2): When the resonant capacitor voltage Vcr exceeds the $V_{BUS}$ by a specific value ΔV (ΔV=Vclamp−$V_{BUS}$), D2, D4, TVS1 and TVS2 are turned on (id2 & id4 and $i_{TVS}$), and the clamping circuit begins to operate so that the resonant capacitor voltage Vcr is clamped to Vclamp, which is higher than $V_{BUS}$ by ΔV (the voltage on the TVS ($V_{TVS}$) is also ΔV during this mode). And the current flowing through D2 and D4 (id2 & id4) also flows through TVS1 and TVS2 ($i_{TVS}$). The resonant current ip is limited to $ip_{limited}$. The synchronous rectifiers SR1 and SR3 are on continuously.

Mode 3 (t2-t3): Qb & Qd are turned off at time t2. After a dead time in which both Qa & Qc and Qb & Qd are not turned on, switches Qa & Qc begin to turn on under zero-voltage switching (ZVS) condition. And the voltage Vin is added on the resonant tank (e.g., Ls1, Lm2, Cr, Lm1, and Ls2). The primary side current ip decreases from the $ip_{limited}$. The voltage on the resonant capacitor Cr, Vcr, is still clamped to the clamping voltage value Vclamp. The current flows through clamping diodes D2 and D4, and TVS (id2 & id4 and iTVS) decreases gradually. When the current decreases to a certain value, the voltage of TVS begins to decrease too. At timing t3, the current flows through clamping diodes D2 and D4 and TVS decreases to zero, and the voltage of TVS decreases to approximate zero also.

The three modes of Mode 4 (t3-t4), Mode 5 (t4-t5) and Mode 6 (t5-t6) are similar to the above-mentioned three modes of Mode 1 (t0-t1), Mode 2 (t1-t2) and Mode 3 (t2-t3), and the clamp diodes D1 and D3 are on. The resonant current on the primary side is limited to $-ip_{limited}$. The resonant capacitor voltage is clamped to −Vclamp.

Mode 1 (t0-t1), Mode 2 (t1-t2), Mode 3 (t2-t3), Mode 4 (t3-t4), Mode 5 (t4-t5) and Mode 6 (t5-t6) form a whole period.

As shown in FIGS. 8 and 9 respectively, the method of separating the resonant capacitors and clamping a part of the resonant capacitors could further raise the clamping voltage value.

Figure 13:
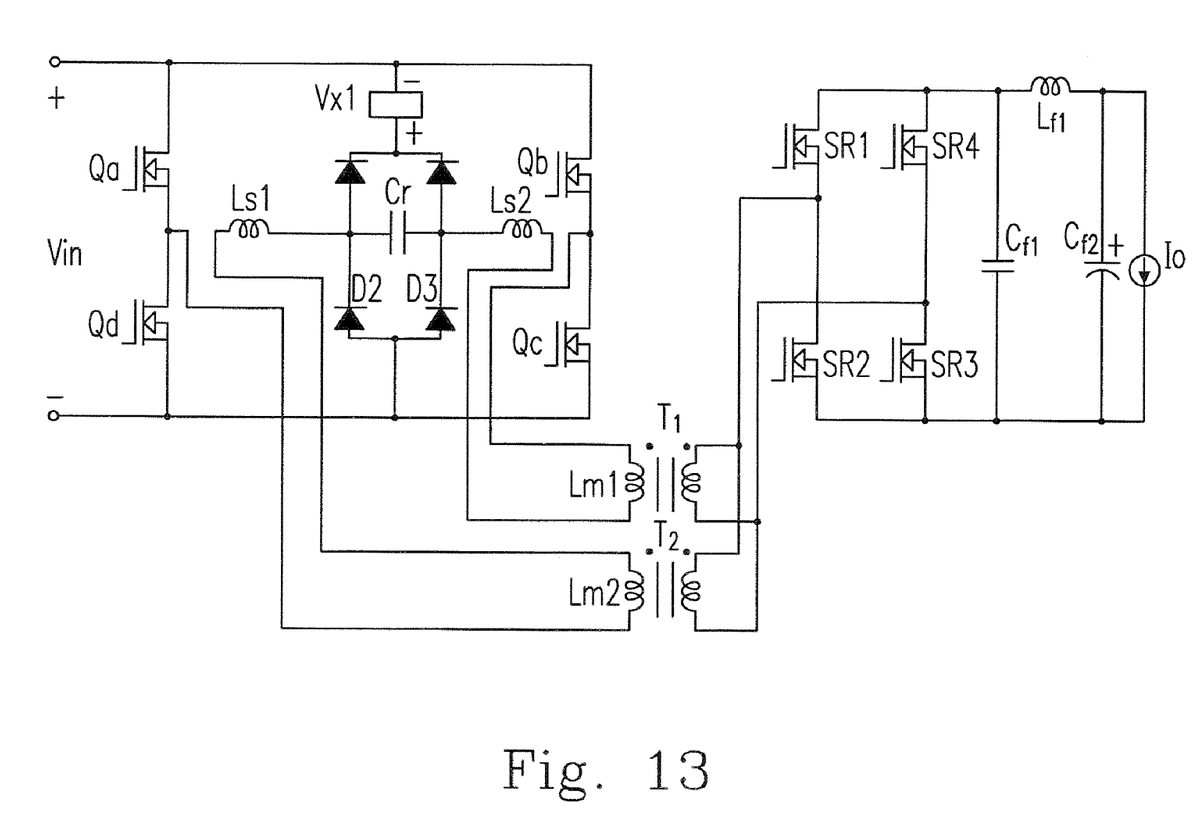
FIG. 13 shows a circuit diagram of a symmetrical full-bridge resonant converter diode-clamped the resonant capacitor voltage according to the fifth preferred embodiment of the present invention.

In the present invention, besides the half-bridge resonant circuit in FIGS. 6 and 8, and the full-bridge resonant circuit in FIGS. 7 and 9, the above embodiments can also apply to three-level and multi-level resonant converters etc. In the present invention, a single clamping switch (e.g., diode) and voltage element could also be used to engage the clamp function. For example, FIG. 13 shows a circuit diagram of a symmetrical full-bridge resonant converter using a voltage element Vx1 and switches (e.g. diodes) to clamp the resonant capacitor voltage according to the fifth preferred embodiment of the present invention. FIG. 13 differs from FIG. 7 mainly in that a voltage element Vx1 is used to clamp, but in FIG. 7, two voltage elements Vx1 and Vx2 are used to clamp. Thus the clamp voltage of the resonant capacitor is asymmetric. And the transformer T in FIG. 7 is replaced by two transformers T1 and T2 in FIG. 13. In FIGS. 6-9, 11 and 13, the bridge circuit Qa-Qb or Qa-Qd is a square wave generator. Except for the embodiment shown in FIG. 13, to achieve a better effect via making the circuit symmetrical, symmetrical clamp is engaged in the rest of the preferred embodiments. This method is simple and easy to be realized, no extra control circuit is required, and the method belongs to a passive control and has a higher reliability. This method could also makes the design of the circuit more flexible, the choices of parameters are not limited to the clamp circuit basically, and possesses the advantage of having an larger operational scope, and could change the clamping voltage value flexibly according to the requirements to make the clamping voltage value be decoupled with the DC input voltage in a specific range. Since only a part of the circuit is required to be added, thus its cost is lower.

According to the aforementioned descriptions, the present invention provides an over-current protection apparatus in a DC/DC resonant converter and a controlling method thereof to provide an OCP in abnormal conditions e.g. when the secondary side of the resonant converter is short-circuited, to solve the problem that the switch current stress is overly large on the primary side, and to solve the problems such as the resonant capacitor voltage is only clamped to the input voltage, the primary side switch current stress is totally decided by the input voltage, and the design parameters of resonant converter circuit and the operational scope are limited so as to possess the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A DC/DC resonant converter, comprising:
   a square wave generator configured to generate a voltage having a square waveform, having a first and a second input terminals receiving a DC input voltage;
   a resonant tank coupled to the square wave generator and comprising:
      a first resonant capacitor; and
      a resonant inductor coupled to the first resonant capacitor; and
   an over-current protection apparatus coupled with the first resonant capacitor and the first input terminal, and comprising:
      a first switch element having a first and a second terminals; and
      a first voltage element having a negative terminal coupled to the first input terminal and a positive terminal coupled to the second terminal of the first switch element.

2. A converter according to claim 1, wherein the first resonant capacitor has a first terminal coupled to the negative terminal of the first voltage element and a second terminal coupled to the first terminal of the first switch element.

3. A converter according to claim 2 further comprising a second resonant capacitor having a first and a second terminals, wherein the second resonant capacitor is connected in series with the first resonant capacitor with the first terminal of the second resonant capacitor connected to the second terminal of the first resonant capacitor and the second terminal of the second resonant capacitor connected to the second input terminal.

4. A converter according to claim 3, wherein the over-current protection apparatus further comprises a second switch element having a first terminal and a second terminal coupled to the first terminal of the first resonant capacitor, and a second voltage element having a negative terminal coupled to the first terminal of the second switch element and a positive terminal coupled to the second input terminal.

5. A converter according to claim 4, wherein the first and the second switch elements respectively are a first and a second clamping diodes, each of which has an anode and a cathode, and the anode and the cathode of each the respective diode are the first and the second terminals of each the respective switch element respectively.

6. A converter according to claim 4, wherein each of the first and the second voltage elements is one of a varistor, a gas tube, a single directional TVS, a bidirectional TVS, a parallel-connected RC circuit and a MOSFET having a gate and a source connected to the gate or the combination thereof.

7. A converter according to claim 4 further comprising a switching switch circuit, a magnetizing inductor, a transformer, an output rectifier circuit, and an output capacitor, and being an LLC resonant converter,
wherein the magnetizing inductor is connected in series with the resonant inductor and connected in parallel with a primary winding of the transformer;
wherein the output rectifier circuit is connected to a secondary winding of the transformer and the output capacitor.

8. A converter according to claim 1 further comprising a third and a fourth resonant capacitors, each of which has a first and a second terminals, wherein the first terminal of the first resonant capacitor is coupled to the negative terminal of the first voltage element, the first terminal of the fourth resonant capacitor is coupled to the second terminal of the first resonant capacitor, the first terminal of the third resonant capacitor is coupled to the second terminal of the fourth resonant capacitor, the first terminal of the first switch element is coupled to the second terminal of the third resonant capacitor and the first terminal of the second resonant capacitor, and the second terminal of the second resonant capacitor is coupled to the second input terminal.

9. A converter according to claim 2, wherein the square wave generator further comprises a second bridge arm coupled with the first input terminal and the second input terminal and comprising a third switch and a fourth switch connected in series with the third switch.

10. A converter according to claim 9, wherein the first resonant capacitor has a first and a second terminals, the over-current protection apparatus further comprises a second, a third and a fourth switch elements, each of which has a first and a second terminals, the first terminal of the first resonant capacitor is coupled to the second terminal of the second switch element, the second terminal of the first resonant capacitor is coupled to the first terminal of the fourth switch element, the second terminal of the second switch element is coupled to the first terminal of the first switch element, the first terminal of the third switch element is coupled to the first terminal of the second switch element, the second terminal of the fourth switch element is coupled to the second terminal of the first switch element, the first terminal of the fourth switch element is coupled to the second terminal of the third switch element, the second input terminal is coupled to the first terminal of the third switch element, the negative terminal of the first voltage element is coupled to the first input terminal, and the positive terminal of the first voltage element is coupled to the second terminal of the first switch element.

11. A converter according to claim 10, wherein the first to the fourth switch elements are respectively a first, a second, a third and a fourth clamping diodes, each of which has an anode and a cathode, and the anode and the cathode of each diode are the first and the second terminals of each switch element respectively.

12. A converter according to claim 10 being an LLC circuit and further comprising a first and a second resonant inductors, a first and a second magnetizing inductors, a first and a second transformers, a synchronous rectification circuit, a first and a second output capacitors, and an output inductor;
wherein the first magnetizing inductor is connected in series with the second resonant inductor, the second magnetizing inductor is connected in series with the first resonant inductor, the first resonant capacitor is connected between the first resonant inductor, the second magnetizing inductor, the second resonant inductor, and the first magnetizing inductor;
wherein a primary side of the first transformer is connected in parallel with the first magnetizing inductor and a primary side of the second transformer is connected in parallel with the second magnetizing inductor;
wherein secondary sides of the first and second transformer are connected in parallel with each other and connected to the synchronous rectification circuit, and the first and the second output capacitors.

13. A converter according to claim 10, wherein the over-current protection apparatus further comprises a second voltage element and a negative terminal of the second voltage element is coupled to the first terminal of the second switch element, and a positive terminal of the second voltage element is coupled to the second input terminal.

14. A converter according to claim 10 being an LLC circuit and further comprising a first and a second resonant inductors, a first and a second magnetizing inductors, a transformer, a synchronous rectification circuit, a first and a second output capacitors, and an output inductor;
wherein the first resonant inductor is coupled to the second magnetizing inductor, the second magnetizing inductor is coupled to the first terminal of the first resonant capacitor, the second resonant inductor is coupled to the first magnetizing inductor, and the first magnetizing inductor is coupled to the second terminal of the first resonant capacitor;
wherein the transformer is coupled to the first and the second magnetizing inductors, the synchronous rectification circuit, the first and the second output capacitors and the output inductor.

15. A converter according to claim 14 further comprising a second and a third resonant capacitors, wherein each of the second and the third resonant capacitors has a first and a second terminals, the first and the second terminals of the second resonant capacitor are coupled to the second magnetizing inductor and the first terminal of the first resonant capacitor respectively, and the first and second terminals of the third resonant capacitor are coupled to the second terminal of the first resonant capacitor and the first magnetizing inductor respectively.

16. An over-current protection apparatus for a DC/DC resonant converter, comprising:
a first switch element having a first and a second terminals; and
a first voltage element having a negative terminal coupled to a positive terminal of an external DC input voltage source, and a positive terminal coupled to the second terminal of the first switch element.

17. A controlling method for a DC/DC resonant converter having an over-current protection apparatus, a resonant tank having a resonant capacitor and a switching circuit having a first set of switches, comprising the steps of:
(a) providing an input voltage to the resonant converter and generating a voltage of the resonant capacitor and a current in the resonant tank;
(b) turning on the first set of switches of the switching circuit when the converter is in a normal operational stage;
(c) turning on the over-current protection apparatus when the voltage of the resonant capacitor exceeds the input voltage and reaches a first predetermined value; and
(d) turning off the first set of switches when the current in the resonant tank begins to decrease from a maximum positive resonant current value.

18. A method according to claim 17, wherein the step (b) further comprises the steps of:
(b1) loading the input voltage to the resonant tank;
(b2) increasing the current from zero to the maximum positive resonant current value; and
(b3) increasing the voltage from a maximum negative clamping voltage value to a maximum positive clamping voltage value, wherein the maximum positive clamping voltage value is larger than the input voltage value.

19. A method according to claim 17, wherein the step (c) further comprises the steps of:
(c1) clamping the resonant capacitor voltage at a maximum positive clamping voltage value; and
(c2) causing the resonant current to be limited at the maximum positive resonant current value.

20. A method according to claim 17, wherein the DC/DC resonant converter further comprises a second set of switches and a resonant loop, and the step (d) further comprises the steps of:
(d1) passing through a dead time and then turning on the second set of switches via a zero-voltage switching;
(d2) adding a negative value of the input voltage to the resonant loop and causing the current in the resonant tank to decrease from the maximum positive resonant current value;
(d3) maintaining the voltage of the resonant capacitor at a maximum positive clamping voltage value for a specific period of time; and
(d4) when the current in the resonant tank decreases to a second predetermined value, causing the voltage of the resonant capacitor to decrease gradually.

21. A controlling method for a DC/DC resonant converter having an over-current protection apparatus, a resonant tank having a resonant capacitor and a switching circuit having a first set of switches, comprising the steps of:
(a) providing an input voltage to the resonant converter and generating a voltage of the resonant capacitor and a current in the resonant tank;
(b) turning on the first set of switches of the switching circuit when the converter is in a normal operational stage;
(c) turning on the over-current protection apparatus when the voltage of the resonant capacitor exceeds the input voltage and reaches a first predetermined value; and
(d) turning off the first set of switches when the current in the resonant tank begins to decrease from a maximum positive resonant current value,
wherein the DC/DC resonant converter further comprises a second set of switches and a resonant loop, and the step (d) further comprises the steps of:
(d1) passing through a dead time and then turning on the second set of switches via a zero-voltage switching;
(d2) adding a negative value of the input voltage to the resonant loop and causing the current in the resonant tank to decrease from the maximum positive resonant current value;
(d3) maintaining the voltage of the resonant capacitor at a maximum positive clamping voltage value for a specific period of time; and
(d4) when the current in the resonant tank decreases to a second predetermined value, causing the voltage of the resonant capacitor to decrease gradually, wherein the DC/DC resonant converter is the DC/DC resonant converter as claimed in claim 14, the first set of switches are the second and the fourth switching switches and the second set of switches are the first and the third switching switches, and the resonant loop comprises the first and the second resonant inductors, the first and the second magnetizing inductors and the first resonant capacitor.

22. A converter according to claim 1, wherein the square wave generator further comprises a first bridge arm coupled with the first and the second input terminals and including a first switch and a second switch connected in series with the first switch.

* * * * *